R. VICK.
TIRE HOLDER.
APPLICATION FILED NOV. 29, 1915.
1,206,951.
Patented Dec. 5, 1916.
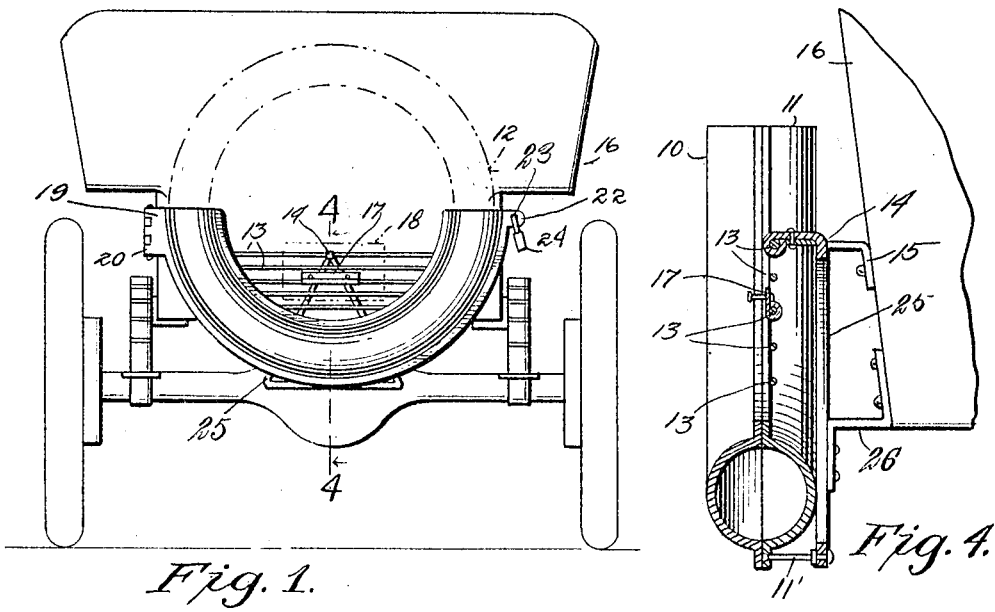
Fig. 1.
Fig. 4.
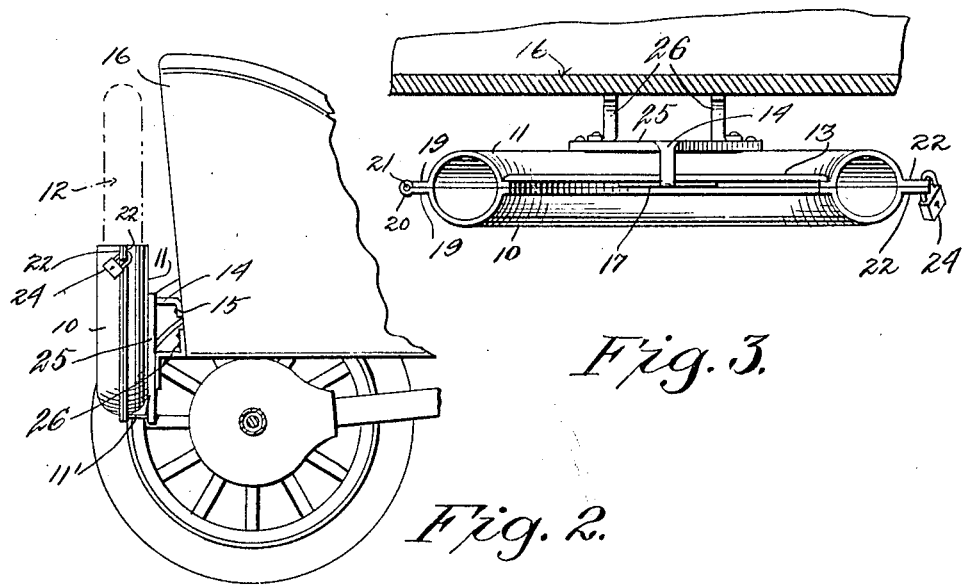
Fig. 2.
Fig. 3.
Witnesses
Inventor
R. Vick
By
Attorney

UNITED STATES PATENT OFFICE.

RAYMOND VICK, OF SEYMOUR, INDIANA.

TIRE-HOLDER.

1,206,951.  Specification of Letters Patent.  Patented Dec. 5, 1916.

Application filed November 29, 1915. Serial No. 64,106.

*To all whom it may concern:*

Be it known that I, RAYMOND VICK, a citizen of the United States, residing at Seymour, in the county of Jackson, State of Indiana, have invented certain new and useful Improvements in Tire-Holders; and I do hereby declare the following to be a full, clear, and exact description of the invention, such as will enable others skilled in the art to which it appertains to make and use the same.

This invention relates to improvements in tire holders, and particularly to holders for supporting spare tires on the rear or at one side of the body of the automobile.

The principal object of the invention is to provide a novel and simple device which will effectively safeguard the owner of the tire against thieves.

Another object is to provide a device of this character which will effectively support the tire without danger of injuring the same.

Other objects and advantages will be apparent from the following description when taken in connection with the accompanying drawing.

In the drawing, Figure 1 is an elevation of my improved tire holder showing the same attached to the rear of an automobile; Fig. 2 is a side view of the same; Fig. 3 is a top plan view; and Fig. 4 is a vertical section on the line 4—4 of Fig. 1.

Referring particularly to the accompanying drawing, the holder comprises a pair of semi-circular sheet metal members 10 and 11, each of which is formed with a semi-circular channel throughout its length and when placed together, as clearly shown on the drawing, forms half of a hollow ring to receive one-half of an inflated tire 12. Extending between, and connected to the arms of the members 11 are bars 13, and connected to one of these bars and extending at right angles therefrom is the upper end of a triangular frame 25. Connected to the apex of this frame is a bracket arm 14, the same being provided with feet 15 whereby the same can be attached to the side or rear of the automobile body 16. The lower end of this frame is secured to the inner section 11 by the bolt 11', while the frame is secured to the vehicle body by the Z-shaped brackets 26. On one of the bars 13 is mounted a holder 17 for supporting the license number tag 18. At the upper end of one of the arms, and on each of the sections 10 and 11 is a laterally extending ear 19, their outer ends being formed with the apertured tubular portions 20 to form a hinge and receive the pintle pin 21. At corresponding points on the other arm are lugs 22 formed with alining openings 23 to receive the shackle of the padlock 24. The pintle pin 21 has both of its ends clenched or flattened so that it can not be readily removed, and thus in connection with the padlock held portion of the device the tire is held securely against abstraction by an unauthorized person.

To remove the tire from the holder, it is only necessary to remove the padlock and then swing the outer section 10 outwardly. The tire can then be moved straight outwardly from the remaining section 11.

The device thus provided is extremely simple and cheap in its construction, and yet is effective to protect the owner from loss of tires by thieves.

What is claimed is:

A tire holder for an automobile comprising a hollow semi-toric casing divided throughout its length, the divisions being hinged together at one end and detachably connected together at the other end, brackets carried by the rear of the body of the automobile, a triangular frame secured to the brackets in a vertical position, the lower or base portion of the triangular frame being secured to the lower portion of one of the divisions of the casing, the upper end of the triangular frame being extended outwardly and formed with a transverse opening, and a transverse bar secured to the upper ends of the said division and disposed through said opening.

In testimony whereof, I affix my signature, in the presence of two witnesses.

RAYMOND VICK.

Witnesses:
S. H. AMICK,
C. E. LOERTZ.